Feb. 19, 1963   R. W. HARTSWICK   3,077,934
ROTOR CONTROL SYSTEM FOR A HELICOPTER
Filed July 19, 1960   4 Sheets-Sheet 1
FIG.1
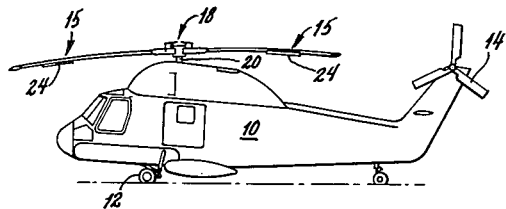
FIG.2
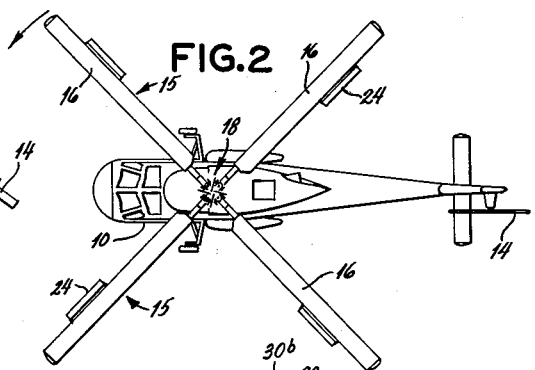
FIG.5
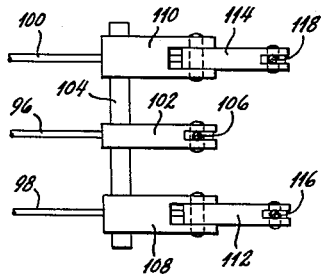
FIG.4
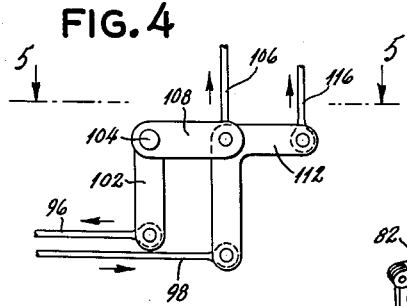
FIG.3
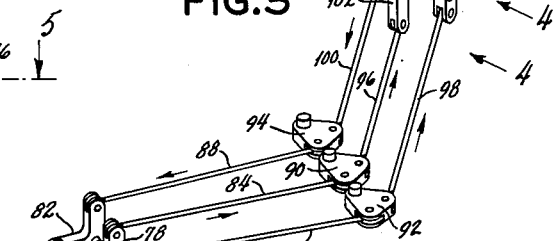
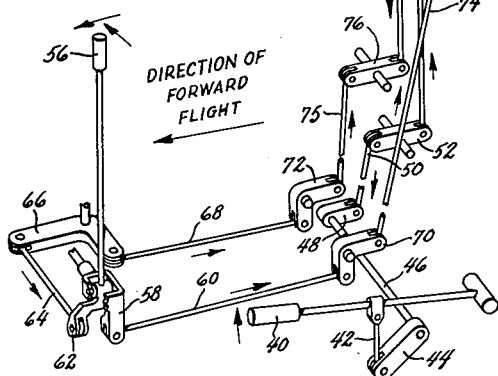
INVENTOR
RICHARD W. HARTSWICK
BY Teller & McCormick
ATTORNEYS

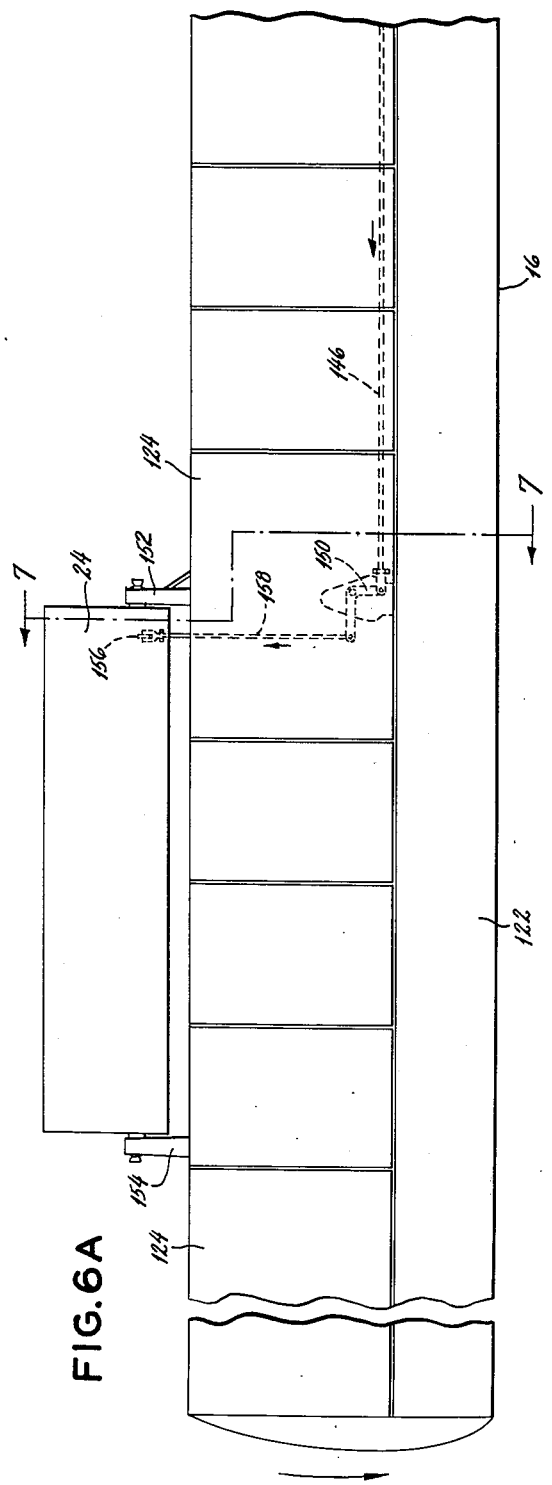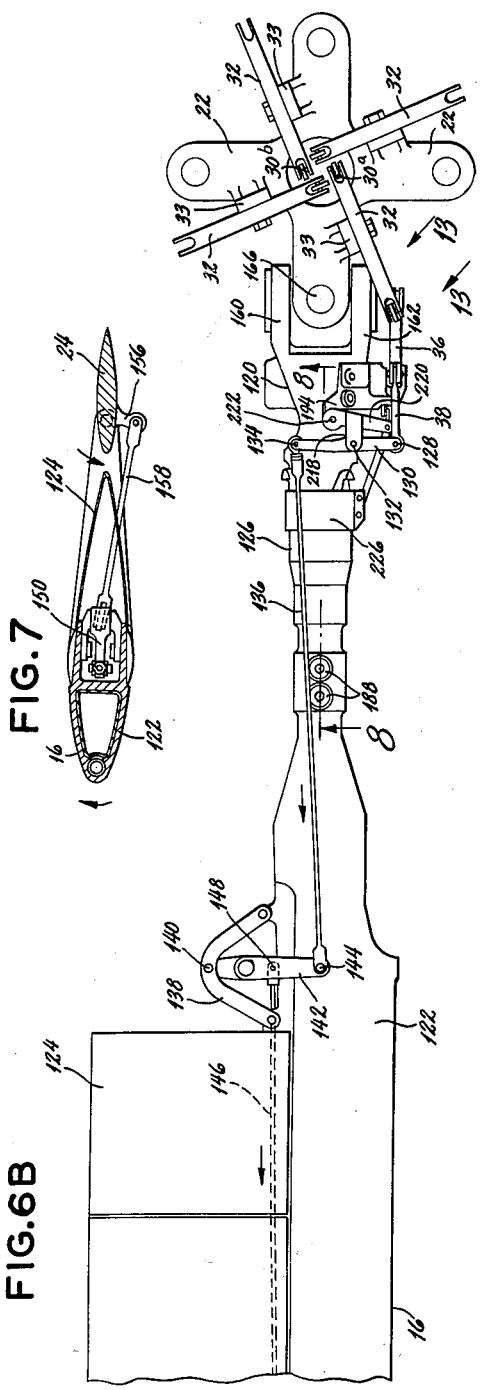

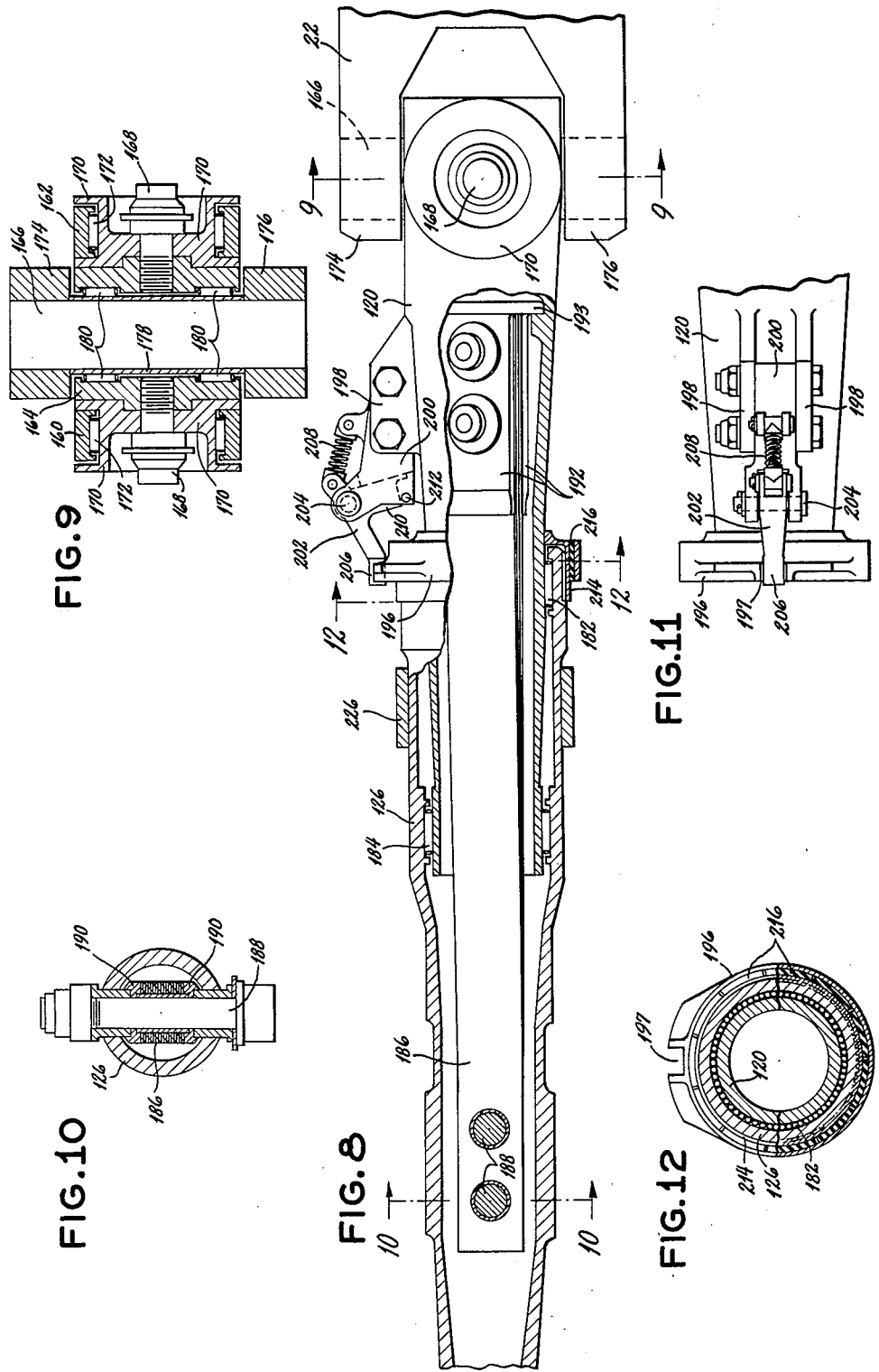

Feb. 19, 1963  R. W. HARTSWICK  3,077,934
ROTOR CONTROL SYSTEM FOR A HELICOPTER
Filed July 19, 1960  4 Sheets-Sheet 4

United States Patent Office 3,077,934
Patented Feb. 19, 1963

3,077,934
ROTOR CONTROL SYSTEM FOR A HELICOPTER
Richard W. Hartswick, Granby, Conn., assignor to Kaman Aircraft Corporation, Bloomfield, Conn., a corporation of Connecticut
Filed July 19, 1960, Ser. No. 43,830
14 Claims. (Cl. 170—160.25)

The invention relates to a rotor control system for a helicopter, and more particularly to a rotor control system which includes servo-flaps for aerodynamically turning the blades about radial axes to change the pitches of said blades and which also includes a main flap moving or adjusting mechanism on the blades connectible with a pilot actuated pitch control mechanism on the fuselage, and which further includes auxiliary or feedback mechanisms on the several blades operable independently of said pilot actuated mechanism on the fuselage for additionally moving or adjusting the flaps.

The invention relates particularly to a control system of the type above defined wherein each flap causes turning movement of the corresponding lifting portion in either direction to change the pitch thereof and wherein an auxiliary or feedback mechanism is provided which is dependent upon pitch changing turning movement of the corresponding lifting portion and serves to turn the flap relatively to said lifting portion and in the same direction that the lifting portion is turned. In accordance with the invention each main flap moving mechanism includes inboard actuating elements and includes outboard actuating elements connected with the inboard actuating elements, and each auxiliary or feedback mechanism is so constructed that it moves said outboard actuating elements relatively to the lifting portion and independently of the inboard actuating elements in order to effect said relative turning movements of the flaps as above set forth.

The invention is particularly applicable to a control system adapted for use with a rotor wherein each blade includes an inboard portion or member which is connected with the hub and held to prevent turning movement about a radial axis and includes an outboard lifting portion which is connected with the inboard portion for limited turning movement about said radial axis.

Other objects of the invention are to provide simple and advantageous mechanical features of the feedback mechanism for attaining the more general object set forth in the last preceding paragraph.

Another object of the invention is to provide a control system such as above defined which is combined with a torsionally resilient means tending to maintain the blades in predetermined initial low pitch positions.

Still another object of the invention is to provide a control system as set forth in the last preceding paragraph which is further combined with automatic locking means that serve to hold the blades in said initial positions when the rotor is stationary or rotating at a low speed and that serve to release the blades for pitch adjustment by the aerodynamic servo-flaps when the rotor rotates at a higher speed.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a side view of a helicopter adapted for the incorporation therein of a rotor blade control system embodying the invention.

FIG. 2 is a plan view of the helicopter shown in FIG. 1.

FIG. 3 is a schematic view of a pilot operable mechanism such as may be connected with the blade control system to which the invention more particularly relates.

FIG. 4 is a fragmentary view taken in the direction of the arrows 4, 4 in FIG. 3 and showing a portion of the pilot operable mechanism.

FIG. 5 is a fragmentary plan view taken along the line 5—5 of FIG. 4.

FIG. 6A is a fragmentary plan view of the outboard portion of one rotor blade, the locking means shown in FIG. 8 being omitted.

FIG. 6B is a plan view of the inboard portion of the rotor blade and of the hub.

FIG. 7 is an enlarged horizontal sectional view taken along the line 7—7 of FIG. 6A.

FIG. 8 is an enlarged combined elevational and vertical sectional view of the inboard portion of the blade with parts of the flap moving mechanism omitted, the sectional portion of the view being taken along the line 8—8 of FIG. 6B.

FIG. 9 is a vertical sectional view taken along the line 9—9 of FIG. 8.

FIG. 10 is a vertical sectional view taken along the line 10—10 of FIG. 8.

FIG. 11 is a fragmentary plan view of certain parts shown in FIG. 8.

FIG. 12 is a transverse sectional view taken along the line 12—12 of FIG. 8, certain interior parts being omitted.

*General Organization—FIGS. 1 and 2*

Figure 13:
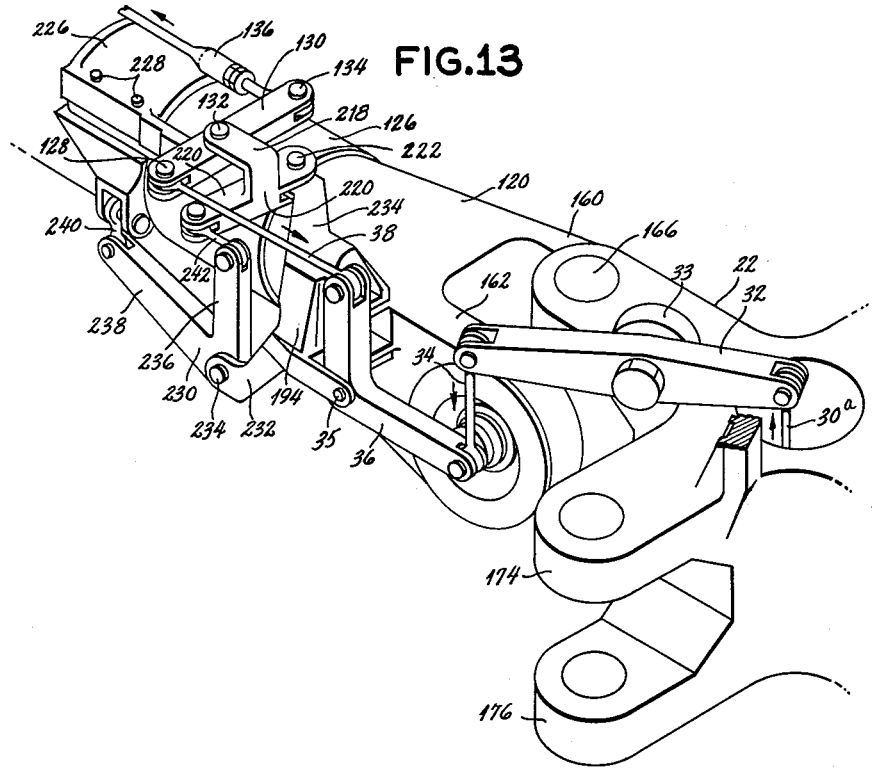
FIG. 13 is an enlarged fragmentary perspective view taken in the general direction of the arrows 13, 13 in FIG. 6B, certain parts shown in FIGS. 11 and 12 being omitted.

Referring to the drawings, and more particularly to FIGS. 1 and 2 thereof, 10 represents the fuselage of a helicopter having a rotor adapted for control by a mechanism embodying the invention, 12 represents the landing gear, and 14 represents the tail rotor. These parts can be widely varied and they do not of themselves constitute any part of the invention.

The rotor of the helicopter comprises a plurality of generally radial blades 15, 15 connected with a hub 18 and uniformly spaced about a central vertical axis. The hub 18 is connected with a vertical power shaft 20 extending upwardly from the fuselage 10. As shown, the rotor has four blades, but the invention is not necessarily so limited.

When there are four blades, as shown, the hub 18 has four radial arms 22, 22 with which the inboard portions of blades 15, 15 are respectively connected for movement about horizontal flapping axes and about vertical lead-lag axes as hereinafter explained in detail. For collective and cyclical changes in pitch, the outboard or lifting portions of the blades are rotatively movable relatively to said inboard portions about radial axes, said lifting portions being designated 16, 16. Such rotative movements of the portions 16, 16 are effected and controlled by means of aerodynamic servo-flaps 24, 24 carried by the respective outboard portions and adjustable relatively thereto about axes parallel with said radial axes. As shown the flaps 24, 24 are at the trailing edges of the blades, but the invention is not necessarily so limited. Mechanism controlled or actuated by the pilot is provided for moving and controlling the flaps 24, 24 so as to change and maintain the blade pitches for all conditions of flight.

*Pilot Actuated Pitch Control Mechanism*
*FIGS. 3, 4 and 5*

For moving the flaps 24, 24 relatively to the blade lifting portions 16, 16 there is provided a pilot actuated pitch control mechanism on the fuselage as shown schematically in FIGS. 3, 4 and 5, this pilot actuated mechanism being connected with other mechanisms on the several blades as partly shown in FIG. 3 and as more fully shown in other figures and later described. The pilot actuated mechanism shown in FIGS. 3, 4 and 5 is merely illustrative and any other suitable mechanism may be substituted.

The pilot actuated mechanism includes an azimuth assembly which is located at or near the bottom of the shaft 20 which shaft is hollow. The azimuth assembly includes a nonrotatable azimuth ring 26 and also includes swash plate 28 which is rotatable within the ring 26. The ring 26 is adjustable vertically and it is also adjustable angularly to angularly change the position of the axis of rotation of the swash plate. When the ring 26 is horizontal, or perpendicular to the axis of the shaft, the axis of rotation of the swash plate 28 coincides with the shaft axis.

When there are four blades there are four vertical rods 30, 30 which are located within the shaft 20 and which are pivotally connected at their lower ends to the swash plate 28. Each of the rods 30, 30 is pivotally connected at its upper end with the inner end of a corresponding lever 32 which is horizontally pivoted between its ends to a fixed support 33 on the hub 18. Each lever 32 is connected at its opposite or outer end with the upper end of a corresponding link 34. The lower end of each link 34 is connected with one arm of a corresponding bell crank 36 movable about a horizontal axis at 35 in fixed relation with the inner member or portion of the corresponding blade. An actuating element or link 38 is connected with the other arm of the bell crank 36 and extends radially outward to control the corresponding flap 24 by means of mechanism hereinafter fully described. FIG. 3 shows only the parts 32, 34, 36 and 38 that are connected with one rod 30, the corresponding parts connected with the other rods being omitted for simplicity of illustration.

A pilot operable collective control stick 40 is provided for moving the azimuth ring 26 vertically for collective changes in blade pitch. As shown, the stick 40 is pivotally movable in a vertical longitudinal plane and it is connected by means of a link 42, an arm 44, a shaft 46 and an arm 48 with an approximately vertical link 50. The connections are such that the link 50 is moved upwardly and downwardly in reverse relationship with the corresponding movements of the stick. The link 50 is connected with a lever 52 which is pivoted between its ends, the lever in turn being connected with a link 54. The link 54 is moved upwardly and downwardly in conformity with the movements of the stick 40.

A pilot operable cyclic control stick 56 is provided for moving the azimuth ring 26 angularly for cyclic changes in blade pitch. The stick 56 is movable forwardly or rearwardly or transversely in either direction. Longitudinal movements of the stick serve by means of an arm 58 to longitudinally move a connected longitudinal link 60. The link 60 is moved rearwardly when the stick is moved forwardly and is moved forwardly when the stick is moved rearwardly. Transverse movement of the stick 56 serves by means of an arm 62, a link 64 and a bell crank 66 to longitudinally move a connected longitudinal link 68 which is parallel with the link 60. The link 68 is moved rearwardly when the stick is moved toward the right and is moved forwardly when the stick is moved toward the left.

The links 60 and 68 are connected respectively with bell cranks 70 and 72 which in turn are connected respectively with approximately vertical links 74 and 75 located adjacent the links 50 and 54. The link 75 is connected with a lever 76 which is pivoted between its ends, the lever being connected in turn to a link 77. The links 54, 74 and 77 are connected respectively with bell cranks 78, 80 and 82 which in turn are connected respectively with rearwardly extending longitudinal links 84, 86 and 88. The links 84, 86 and 88 are connected respectively with arms 90, 92 and 94 which are pivoted for movement about vertical axes. The last said arms are connected respectively with horizontal links 96, 98 and 100 which extend rearwardly and laterally at an angle of 45°.

Referring not only to FIG. 3, but also and more particularly to FIGS. 4 and 5, the link 96 is connected with a bell crank 102 secured to a rotatively movable shaft 104 which is perpendicular to the links 96, 98 and 100 and is therefore at an angle of 45° with respect to longitudinal lines. A vertical link 106 is connected with the bell crank 102, this link being concentric with the axis of shaft rotation and being connected with a vertically movable support 107 for the rotatable swash plate 28. The axis of rotation of the swash plate 28 is angularly adjustable with respect to the support, this angular adjustment being effected by the azimuth ring 26.

Secured to the shaft 104 are arms 108 and 110. Bell cranks 112 and 114 are respectively carried by the arms 108 and 110, these bell cranks being connected respectively with the links 98 and 100. Also respectively connected with the bell cranks 112 and 114 are vertical links 116 and 118 which are connected with the azimuth ring 26 for moving it to various angular positions. The link 116 is connected with the azimuth ring 26 at the point 116ᵃ which is at the rear of the ring and is at a position in the longitudinal central plane of the helicopter, and the link 118 is connected with the azimuth ring 26 at a point 118ᵃ which is at one side of the ring and at a position spaced 90° from the point of connection 116ᵃ for the link 116.

The pivotal axes of the bell cranks 112 and 114 are spaced from the shaft 104 to the same extent as is the link 106, and therefore said axes and said bell cranks move upwardly and downwardly in unison with said link 106 and with the azimuth assembly. The links 98 and 100 are approximately horizontal and therefore the relative motions transmitted to the links 116 and 118 and to the azimuth ring are not materially affected by the vertical movement of the azimuth assembly.

In the description that immediately follows all references to forward and rearward and lateral movements are intended to designate such movements with respect to the fuselage of the helicopter and not necessarily with respect either to free air or to the direction of helicopter movement.

The collective pitch stick 40 can be moved rearwardly and upwardly to increase collective pitch and it can be moved forwardly and downwardly to decrease collective pitch. When the collective pitch stick 40 is moved upwardly and rearwardly, the link 50 is moved downwardly, the link 54 is moved upwardly, the link 84 is moved rearwardly, the link 96 is moved rearwardly and rightwardly and the link 106 is moved upwardly. Thus the entire azimuth assembly is moved upwardly to move all of the rods 30, 30 upwardly. These rods act through the described parts 32, 34, 36 and 38 and through other parts to be described so as to adjust the flaps 24, 24 in such manner that the pitches of all of the blades are collectively increased. It will be obvious that when the stick 40 is moved downwardly and forwardly the several described motions are reversed and the blade pitches are collectively decreased.

The cycle pitch stick 56 can be moved forwardly or rearwardly or rightwardly or leftwardly to cause the helicopter to move in any direction, the direction of movement being the same as that of the stick. When the cyclic pitch stick is moved rightwardly, the link 68 is moved rearwardly, the link 75 is moved upwardly, the link 77 is moved downwardly, the link 88 is moved forwardly, the link 100 is moved forwardly and leftwardly and the link 118 is moved downwardly. Thus the azimuth assembly is tilted downwardly at the right and upwardly at the left, so that during rotation of the swash plate 28 the rods 30, 30 are moved upwardly and downwardly. In so moving, the rods act through the described parts 32, 34, 36 and 38 and through other parts to be described to adjust the flaps 34, 34 so as to produce cyclic pitch changes which provide maximum pitch for each blade when it is forward, this action tending to cause the helicopter to move laterally toward the right as explained below.

Referring particularly to the upper portion of FIG. 3 and to FIG. 6B, it will be understood that the rotor is rotating in the counterclockwise direction and that the blade controlled by the illustrated parts 32, 34, 36 and 38 is extending directly forwardly. This is the blade shown in FIG. 6B. It will be assumed that the cyclic pitch stick has been moved toward the right as above stated and that the azimuth assembly has been tilted downwardly at the right and upwardly at the left. When the blade extends forwardly as shown, the rod 30ª which controls the flap for said blade, is positioned at the left. With the azimuth assembly tilted upwardly at the left, the rod 30ª at the left has been moved upwardly and the flap on the forwardly extending blade has been moved for the maximum blade pitch. There is a lag of approximately 90° in the upward movement of the blade about its horizontal tilting axis and the blade shown at the front therefore attains its maximum upward flapping deflection midway of its retreating movement. At the same time, the rod 30ᵇ, which is at the right and opposite the rod 30ª, has been moved downwardly and the flap on the opposite or rearwardly extending blade, not shown, has been moved to provide minimum blade pitch. As the result of the said lag the blade that was at the rear attains its maximum downward flapping deflection midway of its advancing movement. Thus there is a rotor disc tilt in the same direction as the tilt of the azimuth assembly and the helicopter is caused to move laterally toward the right. It will be obvious that when the stick 56 is moved laterally toward the left the several last described motions are reversed so that the cyclic pitch changes would tend to cause the helicopter to move toward the left.

When the cyclic pitch stick 56 is moved forwardly, the link 60 is moved rearwardly, the link 74 is moved upwardly, the link 86 is moved rearwardly, the link 98 is moved rearwardly and rightwardly and the link 116 is moved upwardly. Thus the azimuth assembly is tilted forwardly. The rods 30, 30 and the associated parts are moved as before described, but they are differently timed to produce cyclic pitch changes which provide maximum pitch for each blade when it is midway of its retreating movement and to provide minimum pitch for each blade when it is midway of its advancing movement. By reason of the before mentioned lag of approximately 90° each blade attains its maximum upward flapping deflection when it is at the rear and attains its maximum downward flapping deflection when it is at the front. This action causes a rotor disc tilt in the same direction as the tilt of the azimuth assembly, that is, in the forward direction, and the helicopter is caused to move forwardly. Except for timing, the action is the same as described in connection with movement of the stick 56 toward the right. It will be obvious that when the stick 56 is moved rearwardly there is a reversal of the several motions described in connection with forward stick movement with the result that the cylic pitch changes would tend to cause the helicopter to move rearwardly.

*Rotor Blades and Main Flap Moving Mechanisms FIGS. 6A, 6B and 7*

Each blade 15 comprises an inboard portion which is connected with the hub 18 for movements relative thereto, which movements may be lead-lag movements about a vertical axis and flapping movements about a horizontal axis; and each blade also comprises a main outboard airfoil lifting portion 16 which is connected with said inboard portion for relative turning movements about a radial axis. Although the invention is not necessarily so limited, the inboard portion of each blade is shown as being a structurally separate member 120 to which the outboard or lifting portion 16 is pivotally connected for movement about said radial axis.

As shown, the main outboard or lifting portion 16 of each blade 15 comprises a radial spar 122 which provides the required airfoil shape for the leading portion of the blade and which carries a plurality of panels 124, 124, these panels serving to provide the required airfoil shape for the trailing portion of the blade. The details of the outboard or lifting portion 16 of the blade may be as set forth in the Lubben, Schauble and McCoubrey application Serial No. 850,953, filed November 4, 1959 and entitled Helicopter Rotor and Method of Making a Blade Member Thereof.

The spar 122 is suitably connected with a tubular supporting member 126. The inboard portion of the member 126 is tubular and it surrounds a portion of the inboard blade member 120 and is pivotally connected therewith as more fully described in connection with FIG. 8. The outboard end of the link 38, sometimes hereinafter called the "first" link, is connected at 128 with the leading end of a transverse lever 130 which is pivoted between ends for movement about a vertical axis at 132. Said lever 130 is sometimes hereinafter referred to as the "first lever." The trailing end of the first lever 130 is connected at 134 with a link 136, sometimes hereinafter called the "second" link, which extends radially outwardly along the top of the supporting member 126. A bracket 138 is secured to the trailing edge of the spar 122 adjacent the innermost panel 124. Pivoted to the bracket 138 at 140 is an intermediate lever 142 which extends in the leading direction, and the outboard end of the second link 136 is connected to said lever at 144. The inboard end of a radial link 146 is connected at 148 with said lever 142. The link 146 is located within the panels 124, 124 and is guided by suitable guide means carried by said panels.

Referring not only to FIG. 6A, but also to FIG. 7, the link 146 is connected at its outboard end with a bell crank 150 which is carried by one of the panels 124 and which may be within said panel as shown. The flap 24 is carried on the lifting portion 16 of the blade by inboard and outboard brackets 152 and 154, the flap being movable about an axis parallel to the radial axis of the blade. Depending from the flap and secured thereto is a horn 156. A transverse link 158 connects the bell crank 150 with the horn 156.

By means of the several links and other parts that have been described, the flaps 24, 24 on the several blades may be pivotally moved relatively to the blades so that they act aerodynamically during rotor rotation to change the pitches of the lifting portions 16, 16 of the blades. The first link 38 and the parts interposed between it and the pilot actuated mechanism on the fuselage are sometimes hereinafter referred to as "inboard actuating elements." The first lever 130, the second link 136 and the link 146 and other parts connected with said inboard actuating elements for moving the flap are sometimes hereinafter referred to as "outboard actuating elements."

Referring particularly to FIG. 7, pivotal movement or adjustment of the flap 24 in the counterclockwise direction indicated by the arrow will be designated as a negative movement of the flap. This movement either decreases a positive pitch of the flap or increases a negative pitch of the flap. Pivotal movement or adjustment in the opposite or clockwise direction will be designated as a positive movement of the flap.

Pivotal movement of the lifting portion 16 of the blade in the clockwise direction as indicated by the arrow will be designated as a positive movement of said lifting portion. This movement either increases a positive pitch or decreases a negative pitch. Pivotal movement or adjustment in the opposite or counterclockwise direction will be designated as a negative movement.

When the flap 24 has a nose-down or negative pitch, aerodynamic forces acting thereon tend to move said flap bodily downwardly and the flap therefore tends to move the trailing edge of the lifting portion 16 bodily downwardly. When the trailing edge is so moved the entire main outboard portion 16 of the blade is turned in the positive direction about its radial axis as the result of that force applied by the flap. When the flap 24 has a nose-up or positive pitch, the action is reversed and the flap tends to move the trailing edge of the lifting portion 16 bodily upwardly and the lifting portion 16 of the blade is turned in the negative direction about its radial axis.

When the rod 30ª is moved upwardly by the azimuth mechanism, the link 34 is moved downwardly, the link 38 is moved in the inboard direction, the links 136 and 146 are moved in the outboard direction and the link 158 is moved in the trailing direction. The flap 24 is turned in the counterclockwise or negative direction to increase the negative pitch thereof and to thereby increase the positive pitch of the lifting portion of the blade. When the rod 30ª is moved downwardly, the described motions are reversed and the flap tends to decrease the positive pitch of the lifting portion of the blade. Otherwise stated, pivotal movement of the flap in the negative direction tends to turn the lifting portion 16 in the positive direction so as to increase a positive pitch of the said portion or to decrease a negative pitch thereof. Pivotal movement of the flap in the positive direction tends to turn the lifting portion 16 in the negative direction so as to decrease a positive pitch or increase a negative pitch.

*Connection of Lifting Portions of Blades With Inboard Member and With Hub—FIGS. 8, 9, 10, 11 and 12*

Referring more particularly to FIGS. 8 and 9, the inboard blade member 120 is tubular and it is bifurcated at its inner end as shown at 160, 162. The bifurcations embrace a pivot block 164 having a vertical bearing opening therein for a lead-lag pivot pin 166 carried by the corresponding arm 22 of the hub. Secured to the block 164 by bolts 168, 168 are bearing blocks 170, 170 which are within bearing openings in said bifurcations 160, 162. Suitable bearings 172, 172 are interposed between the bifurcations 160, 162 and said bearing blocks 170, 170. The blade member 120, and in fact the entire lifting portion 16, is free for flapping movements about the horizontal axis of said bearings 172, 172. Each arm 22 of the hub has upper and lower bifurcations 174 and 176 and the pivot pin 166 extends into openings in these bifurcations and is fixed therein. A sleeve 178 surrounds the pin 166, and bearings 180, 180 are interposed between the sleeve 178 and the block 164. Said block 164 and the entire blade are free for lead-lag movements about the axis of the pin 166.

As has been stated, the inner portion of the supporting member 126 surrounds a portion of the inboard member 120. Bearings 182 and 184 are interposed between the members 126 and 120, these bearings permitting the main outboard portion of the blade to turn relatively to the inboard portion for effecting changes in pitch.

A torsion member is provided for resisting rotative movement of the lifting portion 16 of the blade, and preferably a single member 186 is provided which resists rotative movement of the lifting portion and which also prevents centrifugal outboard movement thereof. The member 186 is shown as being a strap comprising a plurality of thin strips or laminations. As shown, the strap 186 is located within said tubular members 126 and 120. At its outboard end portion, the strap is connected with the member 126 and it is so connected by means of bolts 188, 188 and plates 190, 190. The bolts extend through openings in the side walls of the member 126 and the bolts serve to firmly clamp the plates 190, 190 against said strap. At its inboard end portion, the strap 186 is clamped between plates 192, 192 said plates having noncircular end flanges 193, 193 which fit noncircular recesses in the member 120. The strap 186 thus serves to prevent any outward movement of the member 126 and the parts carried thereby and it also resists rotative movement of said member and parts. When the member 126 and the attached lifting portion 16 of the blade have been rotatively moved from an initial or normal position, said straps tend to return them to said position. Preferably, the strap 186 is slightly twisted when the lifting portion 16 is at its said initial position. The strap therefore applies a very small torque which tends to turn the lifting portion in the pitch increasing direction. Whether the strap 186 is or is not twisted, it serves to provide torsional resistance varying from a minimum to a maximum as the lifting portion 16 is turned from its initial position.

The before-mentioned bell crank 36 is pivoted at 35 to a bracket 194 which is fixedly secured to the inner blade member 120. The axis of pivotal connection at 35 between the link 34 and the bell crank 36, best shown in FIG. 13, is normally coincident with the flapping axis of the blade and the flapping movements of the blade therefore do not materially affect the motion transmitted from the link to the bell crank. The link 34 is normally vertical and there is appreciable looseness in its connections with the lever 32 and with bell crank 36. Relative lead-lag movements of the blade about the lead-lag axis cause the link 34 to move out of its vertical position, but the extent of such movement is not sufficient to materially affect the motion transmitted from the lever 32 to the bell crank 36.

A centrifugally controlled means is preferably provided on each blade for locking the outboard or lifting portion 16 thereof to prevent rotative movement relatively to the inboard member 120 when the rotor is stationary or is rotating below a predetermined speed. The locked position is sometimes referred to as a "predetermined initial position."

Referring more particularly to FIGS. 8, 11 and 12, a ring 196 is secured to the member 126 at the inner end thereof, this ring being provided with a notch 197. The member 120 is provided with outwardly extending flanges 198, 198, between which there is secured a block 200. The block 200 is bifurcated at its outboard end and a locking member 202 is located between the bifurcations of the block, being movable about a pivot pin 204. At the outboard end of the member 202 is a tooth 206 which is adapted to enter the notch 197 in the ring 196. A compression spring 208 biases the member 202 for entry of the tooth in the notch. The radially inward portion of the member 202 at 210 constitutes a weight which during rotor rotation acts centrifugally to move the tooth 206 out of the notch 197. A pin 212 limits movement of the weight portion 210.

When the rotor is stationary or rotating at less than said predetermined speed, the spring 208 holds the member 202 with the tooth 206 in the notch 197, thus holding the outboard or lifting portion of the blade in its said initial position. When the rotor is rotated at a speed above said predetermined speed, the weight 210 acts centrifugally in opposition to said spring 208 to move the tooth 206 out of the notch 197 so that the outer lifting portion 16 of the blade is free to turn under the control of the flap 24.

Preferably the ring 196 is not rigidly connected with the member 126, but is connected indirectly therewith by means of a ring 214 and resilient cushion elements 216, 216 as shown in FIG. 12. The ring 214 is fixedly secured to the member 126 and the elements 216, 216 are interposed between the two rings. The cushion members 216, 216 are formed of rubber or equivalent material.

When the rotor speed is decreasing and falls below said predetermined speed, each lifting portion 16 tends to turn to its said initial position. When the lifting portion reaches said position, the tooth 206 snaps into the notch 197. The cushion elements 216, 216 permit slight rotative movement of the ring 196 relatively to the ring 214 and they thus absorb shock.

*Auxiliary Flap Moving Mechanisms*
*FIGS. 6B and 13*

The present invention relates primarily to auxiliary mechanisms on the several blades for effecting compensating angular adjustments of the corresponding flaps in accordance with the rotative pitch changing movements of the lifting portions 16, 16 of the blades. The character and purpose of the compensating adjustments will be hereinafter more fully stated.

Carried by each blade is a mechanism that serves to change the relative angular position of the corresponding flap in accordance with the rotative adjustment of said outboard lifting portion 16 of the blade. This mechanism is preferably carried in part by the rotatively adjustable outboard or lifting portion 16 of each blade and in part by the nonrotatable inboard portion or member thereof. The mechanism may be widely varied as to details, but the presently preferred mechanism will now be described.

The pivotal axis 132 for the first lever 130 is not fixed and said lever is carried by a radially outwardly extending arm 218 forming a part of a transverse second lever 220. The trailing end of the lever 220 is pivoted at 222 to an arm 234 forming a part of the bracket 194 on the nonrotative blade member 120.

The auxiliary flap moving mechanism includes a motion imparting element 226 on the rotatively movable supporting member 126. As shown, the element 226 is in the form of a split sleeve which is clamped to the member 126 by bolts 228. A third lever or bell crank 230 is pivotally connected with an arm 232 forming a part of the bracket 194 for movement about a horizontal axis at 234, said bell crank having its arms 236 and 238 extending respectively upwardly and radially outwardly from said pivotal axis. A vertical link 240 is pivotally connected at its ends with the element 226 and with the arm 238 of the bell crank 230. The arm 236 of the bell crank 230 is connected by a radially extending link 242 with the leading end of the second lever 220.

For the purpose of explanation, it may be assumed that the lifting portion 16 of the blade is in the initial position shown in FIG. 7 and that the flap 24 is correspondingly positioned. It may further be assumed that the various parts shown in FIG. 13 are in positions corresponding to the blade and flap positions as shown in FIG. 7. As previously stated, upward movement of a rod 30 causes radially outward movement of the link 136 with resultant angular adjustment of the corresponding blade flap 24 to change the pitch angle thereof in the negative direction. When the pitch angle of the flap is so changed it acts aerodynamically during rotor rotation to turn the lifting portion 16 in the positive direction to increase blade pitch, the entire main outboard lifting portion 16 being turned clockwise or in the positive direction as viewed in FIG. 13. As the lifting portion 16 turns clockwise from the FIG. 7 position, the flap 24 swings bodily downwardly.

When the member 126 and the sleeve 226 move clockwise in the positive direction as above stated, the link 240 is moved upwardly, the bell crank 230 is moved clockwise, the link 242 is moved radially inwardly, and the second lever 220 is moved counterclockwise. As the lever 220 is moved counterclockwise, the pivotal axis 132 of the first lever 130 is moved radially inwardly. Assuming that no motion is being transmitted from the rod 30 to the link 38, the pivotal axis at 128 is stationary and the first lever 130 is moved clockwise about the axis 128, and the link 136 is moved radially inwardly with resultant movement of the flap 24 in the positive direction with respect to the lifting portion 16. It will be evident that all of the last described motions are reversed when the lifting portion 16 is moved counterclockwise or in the negative direction, the flap being moved in the negative direction with respect to the lifting portion.

Otherwise stated, the parts 36 and 38 constitute inboard flap actuating elements connectible with the nonrotatable pilot operated pitch control mechanism on the fuselage. The parts 130, 136, 142, 146, 150 and 158 constitute outboard flap actuating elements connected between said inboard actuating elements and the flap. The parts 226, 240, 230, 242 and 220 constitute an auxiliary flap moving mechanism operatively dependent upon pitch changing turning movements of the lifting portion 16 and serving upon such turning movement to move the aforesaid outboard actuating elements independently of the aforesaid inboard actuating elements so as to pivotally move the flap relatively to the lifting portion in the same direction that said lifting portion is turned about its radial axis.

The before mentioned inboard flap actuating elements include the radially extending and radially movable link 38, and the before mentioned outboard flap actuating elements include the radially extending and radially movable links 136 and 146. Some of the outboard actuating elements, including the links 136 and 146, are carried by the lifting portion of the blade so as to be bodily movable rotatively in unison with the turning movements of said lifting portion.

*More Specific Explanation of Action of Auxiliary Flap Moving Mechanisms—FIGS. 14, 15, 16, 17, 18 and 19*

The herein-described servo-flaps 24 for turning the lifting portions 16 to control the pitches thereof are generally similar to the servo-flaps shown in the Kaman and Stevens Patent No. 2,695,674 dated November 30, 1954 and entitled Control System for Multiple Rotor Helicopter. As shown in said patent, the flaps are carried by twistable torsionally resilient blades and the turning or twisting action of each flap continues until the flap action tending to effect blade twisting is balanced by the torsional resistance of the blade and by other force components.

The herein-described servo-flaps 24 for turning the lifting portions 16 to control the pitches thereof are also generally similar to the servo-flaps shown in the aforesaid Lubben, Schauble and McCoubrey application Serial No. 850,953. As shown in said application, the flaps are carried by rigid blade lifting portions each of which is connected with an inboard member by separate torsionally resilient means which may be tension-torsion straps.

Figure 14:
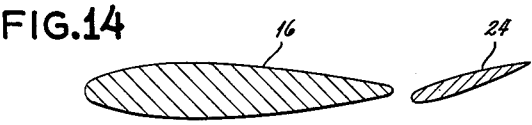
FIG. 14 is a schematic view generally similar to FIG. 7, but showing a blade lifting portion and a flap in accordance with the prior art.
Figure 15:
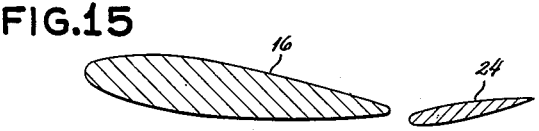
FIG. 15 is a view similar to FIG. 14, but showing the lifting portion and flap in different positions.

With the construction shown in said patent or with the construction shown in said application, let it be assumed that the flap has been turned in the negative direction, as shown in FIG. 14, so as to turn the lifting portion of the blade in the positive or pitch increasing direction. The lifting portion of the blade is aerodynamically turned in the positive direction by the action of the flap until the turning force applied by the flap is balanced by the resistance offered by the twistable blade or by the separate torsionally resilient means. The relative positions of the lifting portion and of the flap are shown in FIG. 15. It will be observed that the flap has the same relationship to the lifting portion as in FIG. 14. The flap continues to tend to turn the lifting portion, turning being limited by the large resistance offered by the twistable blade or by the separate resilient means. The resistance offered as aforesaid is augmented by centrifugal forces which vary with rotative speed. Reference has been made particularly to collective pitch control, but the described characteristics apply also to cyclic pitch control. With the mechanism of the present invention, the above mentioned resistance can be eliminated or drastically reduced. As herein disclosed, a small resistance member 186 is provided and the resistance may be on the order of 10% of the resistance that would otherwise be necessary.

Cyclic control sensitivity is completely a function of the relative movement producing capabilities of the servo-flap and of the restraining torsional resistance. As the amount of restraining torsional resistance is decreased, the sensitivity is increased. Assuming forward flight, there is a variation in velocity with respect to free air during the rotation of the blades. The advancing blade will have the largest velocity, the retreating blade will have the smallest velocity. This velocity differential acting on the steady collective flap deflections tends to produce a variation in pitching moments on the rotor system, an incremental nose-up or positive pitching moment being produced on the advancing blade and an incremental nose-down or negative moment being produced on the retreating blade. This variation in moment implies a pitch angle variation in the blade, since the moments can only be balanced by torsional resistance. Hence, imposing forward flight velocities on a rotor with negative flap deflections applied to produce collective pitch also produces an aft component of cyclic pitch. This aft component of cyclic pitch must be overcome by additional forward cyclic stick adjustment. The amount of additional forward cyclic adjustment is a direct function of the amount of negative flap angle used to maintain rotor blade collective pitch and hence is directly proportional to the torsional resistance. In accordance with the present invention the amount of torsional resistance is greatly reduced, and this practically eliminates the necessity for the additional forward adjustment of the cyclic stick.

In addition, rotor systems depending to a major extent upon torsional resistance suffer a decrease in control sensitivity with altitude. This occurs because while the flap becomes less powerful due to the decrease in air density and hence the decrease in dynamic pressure at constant r.p.m., the trosional resistance remains constant. Such a detriment in control sensitivity with altitude makes the helicopter more difficult to fly and makes the control system more difficult to properly adjust.

FIGS. 16, 17, 18 and 19 schematically show the lifting portion 16 of one blade and the corresponding flap 24 when the auxiliary flap moving mechanism of the invention is provided, said lifting portion and said flap being in various relative positions. In order that the action of the auxiliary flap moving mechanisms may be clearly understood, it will be assumed that the helicopter is hovering or moving vertically, no cyclic pitch changes being imparted to the blades.

It will be evident that by means of the pilot actuated mechanisms, the several flaps 24, 24 can be moved in either direction independently of the corresponding lifting portion, and that the flaps thereupon act aerodynamically to change the pitches of said lifting portions. Negative turning movement of the flap 24 causes positive turning movement of the lifting portion 16 relatively to the inboard member 120, and positive turning of the flap 24 causes negative turning movement of the lifting portion 16 relatively to the inboard member 120. As the lifting portion 16 turns positively or negatively relatively to the inboard member, the auxiliary flap moving mechanism turns the flap in the same direction relatively to the lifting portion.

Figure 16:
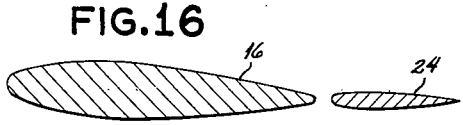
FIG. 16 is a schematic view generally similar to FIG. 7, but showing the blade and flap in slightly different positions.
Figure 17:
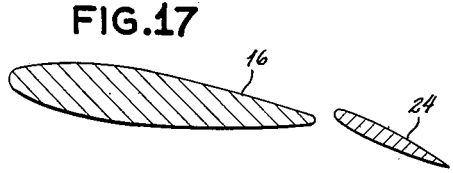
FIG. 17 is a view similar to FIG. 16, but showing the blade and flap in different positions.

Referring particularly to FIG. 16 it is assumed that the lifting portions are in their said initial positions. When a locking means is provided for each blade as shown in FIGS. 8, 11 and 12, said means serves to lock the lifting portion 16 in said initial position whenever the rotor is stationary or is rotating at a speed below a predetermined speed. However, when the speed of rotation is higher than pitch lock speed, but nevertheless relatively low, the pilot operable control mechanism may be tending to maintain the lifting portion in a position such as that shown in FIG. 16 wherein the pitch is small and wherein the automatic locking means has not acted. At such a relatively low speed the lifting portion 16 of one blade of the rotor, or possible of more one blade, may be displaced, as for example, in the positive direction by a gust of wind or otherwise, and the lifting portion may be momentarily turned to a position such as that shown in FIG. 17 wherein it has a substantial positive pitch which is undesirable. The action of the auxiliary flap moving mechanism is such that the flap is always turned relatively to the lifting portion in the same direction that the lifting portion is turned relatively to the inboard member. Therefore when the lifting portion is moved relatively to the inboard member and in the positive direction, to the position shown in FIG. 17, the flap is also moved relatively to the lifting portion and in the positive direction to the position shown in FIG. 17. Assuming continued rotor rotation, the flap 24 then acts aerodynamically to move the lifting portion 16 in the negative direction and to restore it to the FIG. 16 position. The last-described action would be reversed if the lifting portion were displaced in the negative direction. While the last-described action has been described with reference to a relatively low rotor speed, the auxiliary flap moving mechanism would act as stated at all higher rotor speeds.

Figure 18:
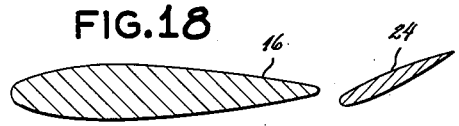
FIG. 18 is a view generally similar to FIG. 7, but showing the flap in a different position.
Figure 19:
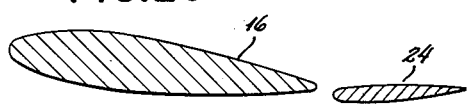
FIG. 19 is a view similar to FIG. 18, but showing the blade and flap in positions resulting from movement of the flap to the position shown in said FIG. 18.

Referring particularly to FIGS. 18 and 19, it may be assumed that the rotor is operating at a speed sufficient to effect the release of the several locking means, and it may be further assumed that the pilot by means of the said pilot actuated mechanism has moved the flap 24 in the negative direction to the position shown in FIG. 18, this being for the purpose of turning the lifting portion 16 in the positive direction for increased lift.

As the lifting portion 16 is moved aerodynamically by the flap 24 in the positive direction relatively to the inboard member 120, the flap 24 is moved in the positive direction relatively to the lifting portion 16. This continues until the FIG. 19 relationship is reached wherein the flap has only a very small negative pitch. Only a very small resistance is necessary to maintain the relationship shown, this being provided by the relatively small torsion resistance strap 186. In connection with FIGS. 18 and 19, vertical movement or hovering has been assumed for the sake of simplicity, but the action is similar when there are cyclic pitch changes.

In accordance with the invention, only minor reliance is placed upon the torsional resistance element such as 186. Instead the motions of the flap are so controlled as to provide the necessary moment stabilization for the blade. When the blade is operating at a given pitch angle the flap is close to its neutral position, since it only has to provide sufficient pitching moment on the blade to overcome the small resistance at 186 and any centrifugal twisting moments. These resistance factors are much smaller than those supplied by a device constructed in accordance with the prior art, hence flap deflections are considerably smaller than for conventional servo-flap rotor systems. When the blade is disturbed from its original position flap deflection is automatically changed in such a direction as to return the blade to its initial equilibrium position.

The invention eliminates a number of the compromises necessary in the conventional servo-flap rotor system. For example, the elimination of or the radical reduction in torsional resistance results in very much smaller equilibrium flap angles required to maintain a given collective pitch. The helicopter becomes thus easier to fly and to stabilize in high speed flight. Furthermore, the elimination of or the radical reduction in torsional resistance reduces the variation of control sensitivity on altitude.

The invention claimed is:

1. A rotor for use in a helicopter having a fuselage and a substantially vertical power driven main shaft connected with said fuselage which rotor includes in combination: a hub connectible with said shaft, a plurality of similar radially extending blades each including an outboard airfoil lifting portion connected with said hub for limited turning movement about a radial axis, a plurality of similar airfoil flaps carried respectively by said lifting portions and pivotally movable relatively thereto about axes substantially parallel with said radial axes, a plurality of similar mechanisms on the respective blades for pivotally moving the several flaps relatively to their lifting portions so as to enable said flaps to act aerodynamically during rotor rotation to turn said lifting portions about said radial axes and to thereby change their effective pitches, each said flap moving mechanism including inboard actuating elements connectible with a nonrotatable pilot actuated pitch control mechanism on the fuselage and also including outboard actuating elements connected with said inboard actuating elements and extending outwardly therefrom, and a plurality of similar auxiliary flap moving mechanisms on the respective blades each operatively dependent upon pitch changing turning movement of the lifting portion of the corresponding blade and serving upon such turning movement to move the corresponding outboard actuating elements independently of the corresponding inboard actuating elements so as to pivotally move the corresponding flap relatively to its lifting portion and in the same direction that said lifting portion is turned about its radial axis by the aerodynamic action of said flap.

2. A rotor as set forth in claim 1, wherein at least one of said inboard actuating elements is a radially movable link, and wherein at least one of said outboard actuating elements is a radially movable link, and wherein each said auxiliary flap moving mechanism serves to radially move the corresponding said outboard link relatively to the corresponding said inboard link.

3. A rotor as set forth in claim 1, wherein at least one of the outboard actuating elements is carried at least in part by the lifting portion of the corresponding blade and is movable rotatively in unison with the pitch changing turning movements of said lifting portion.

4. A rotor as set forth in claim 1, wherein each blade includes an inboard portion connected with the hub and held to prevent turning movement about a radial axis, wherein each said outboard lifting portion is connected with the corresponding inboard portion for limited pitch changing turning movement about said radial axis and relatively to said inboard portion, and wherein each said auxiliary flap moving mechanism is connected to be dependent upon said relative turning movement of said outboard lifting portion.

5. A rotor as set forth in claim 4, wherein the inboard portion of each blade is a member structurally separate from the outboard lifting portion of said blade, and wherein bearings are interposed in each blade between said inboard member and said outboard lifting portion so as to provide for relative pivotal turning movement of said outboard portion.

6. A rotor as set forth in claim 4, wherein at least one of said inboard actuating elements is radially movable link carried by the inboard portion of the corresponding blade, wherein at least one of said outboard actuating elements is a radial movable link carried at least in part by the outboard portion of the corresponding blade, and wherein each said auxiliary flap moving mechanism serves to radially move the corresponding said outboard link relatively to the corresponding said inboard link.

7. A rotor for use in a helicopter having a fuselage and a substantially vertical power driven main shaft connected with said fuselage which rotor includes in combination: a hub connectible with said shaft, a plurality of similar radially extending blades each including an inboard portion connected with the hub and held to prevent turning movement about a radial axis and each also including an outboard airfoil lifting portion connected with said inboard portion for limited turning movement about said radial axis, a plurality of similar airfoil flaps carried respectively by said lifting portions and pivotally movable relatively thereto about axes substantially parallel with said radial axes, a plurality of similar mechanisms on the respective blades for pivotally moving the several flaps relatively to their lifting portions so as to enable said flaps to act aerodynamically during rotor rotation to turn said lifting portions about said radial axes and to thereby change their effective pitches, each said flap moving mechanism including inboard actuating elements connectible with a nonrotatable pilot actuated pitch control mechanism on the fuselage and also including outboard actuating elements connected between said inboard actuating elements and the corresponding flap with at least one of which outboard actuating elements being carried at least in part by the corresponding lifting portion so as to be movable rotatively in unison with turning movements thereof, and a plurality of auxiliary flap moving mechanisms on the several blades each operatively dependent upon pitch changing turning movements of the lifting portion of the corresponding blade for moving the outboard actuating elements of the corresponding first said flap moving mechanism independently of the inboard actuating elements thereof and relatively to the corresponding lifting portion so as to pivotally move the corresponding flap in the positive direction relatively to its lifting portion when said lifting portion is turned in the positive direction relatively to said inboard portion and so as to pivotally move said flap in the negative direction relatively to its lifting portion when said lifting portion is turned in the negative direction relatively to said inboard portion.

8. A rotor for use in a helicopter having a fuselage and a substantially vertical power driven main shaft connected with said fuselage which rotor includes in combination: a hub connectible with said shaft, a plurality of similar radially extending blades each including an inboard member connected with the hub and held to prevent turning movement about a radial axis and each also including an outboard airfoil lifting portion having a supporting member surrounding a portion of the inboard member and each further including bearings interposed between said inboard member and said supporting member for controlling limited pivotal turning movement of said lifting portion about said radial axis, a plurality of similar airfoil flaps carried respectively by said lifting portions and pivotally movable relatively thereto about axes substantially parallel with said radial axes, a plurality of mechanisms on the respective blades for pivotally moving the several flaps relatively to their respective lifting portions so as to enable said flaps to act aerodynamically during rotor rotation to turn the respective lifting portions about said radial axes and to thereby change the effective pitches of said lifting portions, each said flap moving mechanism including inboard actuating elements connectible with a nonrotatable pilot actuated pitch control mechanism on the fuselage and also including outboard actuating elements connected between said inboard actuating elements and the corresponding flap, and a plurality of auxiliary flap moving mechanisms each carried in part by the corresponding inboard member and in part by the corresponding supporting member and dependent upon relative turning movement of the latter for moving the outboard actuating elements of the corresponding first said flap moving mechanism independently of the inboard actuating elements thereof so as to pivotally move the corresponding flap in the positive direction relatively to its lifting portion when said lifting portion is turned in the positive direction relatively to said inboard portion and so as to pivotally move said flap in the negative direction relatively to its lifting portion when said lifting portion is turned in the negative direction relatively to said inboard portion.

9. A rotor for use in a helicopter having a fuselage and a substantially vertical power driven main shaft connected with said fuselage which rotor includes in combination: a hub connectible with said shaft, a plurality of similar radially extending blades each including an inboard member connected with the hub and held to prevent turning movement about a radial axis and each also including an outboard airfoil lifting portion pivotally connected with said inboard member for limited pivotal turning movement about said radial axis, a plurality of similar airfoil flaps carried respectively by said lifting portions and pivotally movable relatively thereto about axes substantially parallel with said radial axes, a plurality of mechanisms for pivotally moving the several flaps relatively to their respective lifting portions so as to enable said flaps to act aerodynamically during rotor rotation to turn the respective lifting portions about said radial axes and to thereby change the effective pitches of said lifting portions, each said flap moving mechanism including inboard actuating elements connectible with an actuating mechanism on the fuselage and also including outboard actuating elements connected between said inboard actuating elements and the corresponding flap which said outboard actuating elements include a bell crank located on the lifting portion of the blade near the flap and movable about nonradial axes and also include a transverse link connected between said bell crank and said flap, and a plurality of auxiliary flap moving mechanisms on the several blades each operatively dependent upon pitch changing turning movements of the lifting portion of the corresponding blade for turning the corresponding bell crank about its axis independently of the corresponding inboard actuating elements so as to pivotally move the corresponding flap in the positive direction relatively to its lifting portion when said lifting portion is turned in the positive direction relatively to said inboard portion and so as to pivotally move said flap in the negative direction relatively to its lifting portion when said lifting portion is turned in the negative direction relatively to said inboard portion.

10. A rotor for use in a helicopter having a fuselage and a substantially vertical power driven main shaft connected with said fuselage which rotor includes in combination: a hub connectible with said shaft, a plurality of similar radially extending blades each including an inboard member connected with the hub and held to prevent turning movement about a radial axis and each also including an outboard airfoil lifting portion pivotally connected with said inboard member for limited pivotal turning movement about said radial axis, a plurality of similar airfoil flaps carried respectively by said lifting portions and pivotally movable relatively thereto about axes substantially parallel with said radial axes, a plurality of mechanisms for pivotally moving the several flaps relatively to their respective lifting portions so as to enable said flaps to act aerodynamically during rotor rotation to turn the respective lifting portions about said radial axes and to thereby change the effective pitches of said lifting portions, each said flap moving mechanism including a radially movable inboard actuating element or first link connectible with a nonrotatable pilot actuated pitch control mechanism on the fuselage and also including outboard actuating elements connected between said first link and the corresponding flap, one of said outboard actuating elements being a radially movable second link carried by the corresponding lifting portion and another of said outboard actuating elements being a transverse first lever movable about a pivotal axis between its ends and connected at its respective ends with the outer end of said radially movable first link and with the inner end of said radially movable second link, and a plurality of auxiliary flap moving mechanisms on the several blades each operatively dependent upon pitch changing turning movements of the corresponding lifting portion for radially moving the pivotal axis of said first lever and for thereby moving said lever and said second link independently of said first link in order to pivotally move the corresponding flap so that turning movement of the lifting portion in either direction relatively to the inboard portion serves to turn the flap in the same direction relatively to said lifting portion.

11. A rotor as set forth in claim 10, wherein each said auxiliary flap moving mechanism includes a second lever which is movable about an axis in fixed relation to said inboard member and which carries the axis of the first said lever, and wherein each said auxiliary flap moving mechanism also includes means operatively dependent upon pitch changing turning movements of the corresponding lifting portion relatively to the inboard member for moving said second lever about its pivotal axis and for thereby radially moving the pivotal axis of said first lever.

12. A rotor as set forth in claim 11, wherein the means included in each auxiliary flap moving mechanism and operatively dependent upon pitch changing turning movements of the lifting portion includes a third or bell crank lever pivotally movable about an axis in fixed relation to the inboard member and also includes a link connecting the pivotally movable lifting portion with one arm of the bell crank lever and further includes a link connecting the other arm of the bell crank lever with said second lever.

13. A rotor for use in a helicopter having a fuselage and a substantially vertical power driven main shaft connected with said fuselage which rotor includes in combination: a hub connectible with said shaft, a plurality of similar radially extending blades each including an inboard member connected with the hub and held to prevent turning movement about a radial axis and each also including an outboard airfoil lifting portion connected with said inboard member for limited pivotal turning movement about said radial axis in either direction from a predetermined initial position, each said blade further including a torsionally resilient member connected with said inboard member and with said lifting portion and located close to said radial axis so as to provide torsional resistance varying from a minimum to a maximum as the lifting portion is turned from its said initial position, a plurality of similar airfoil flaps carried by the several lifting portions and pivotally movable relatively thereto about axes substantially parallel with said radial axes, a plurality of mechanisms on the several blades for pivotally moving the flaps relatively to their respective lifting portions so as to enable said flaps to act aerodynamically during rotor rotation to turn the respective lifting portions about said radial axes and to thereby change the effective pitches of said lifting portions, each said flap moving mechanism including inboard actuating elements connectible with a pilot actuated pitch control mechanism on the fuselage and also including outboard actuating elements connected between said inboard actuating elements and the corresponding flap, and a plurality of auxiliary flap moving mechanisms on the several blades each operatively dependent upon pitch changing turning movements of the lifting portion of the corresponding blade and serving to move the outboard actuating elements of the corresponding flap moving mechanism independently of the inboard actuating element thereof and relatively to the corresponding lifting portion so as to pivotally move the corresponding flap in the positive direction relatively to its lifting portion when said lifting portion is turned in the positive direction relatively to said inboard portion and so as to pivotally move said flap in the negative direction relatively to its lifting portion when said lifting portion is turned in the negative direction relatively to said inboard porion.

14. A rotor for use in a helicopter having a fuselage and a substantially vertical power driven main shaft connected with said fuselage which rotor includes in combination: a hub connectible with said shaft, a plurality of similar radially extending blades each including an inboard member connected with the hub and held to prevent turning movement about a radial axis and each also including an outboard airfoil lifting portion connected with said inboard member for limited pivotal turning movement about said radial axis in either direction from a predetermined initial position, each said blade further including a torsionally resilient member connected with said inboard member and with said lifting portion and located close to said radial axis so as to provide torsional resistance varying from a minimum to a maximum as the lifting portion is turned from its said initial position, a plurality of locking means located on the respective blades which locking means are automatically operable to lock said lifting portions in their initial positions when the rotor is stationary or rotating at a speed below a predetermined speed and are constructed to act centrifugally so as to release said lifting portions to permit pivotal turning movements thereof when the rotor is rotating at or above said predetermined speed, a plurality of similar airfoil flaps carried by the several lifting portions and pivotally movable relatively thereto about axes substantially parallel with said radial axes, a plurality of mechanisms on the several blades for pivotally moving the flaps relatively to their respective lifting portions so as to enable said flaps to act aerodynamically during rotor rotation to turn the respective lifting portions about said radial axes and to thereby change the effective pitches of said lifting portions, each said flap moving mechanism including inboard actuating elements connectible with a pilot actuated pitch control mechanism on the fuselage and also including outboard actuating elements connected between said inboard actuating elemets and the corresponding flap, and a plurality of auxiliary flap moving mechanisms on the several blades each dependent upon pitch changing turning movements of the lifting portion of the corresponding blade and serving to move the outboard actuating elements of the corresponding flap moving mechanism independently of the inboard actuating elements thereof and relatively to the corresponding lifting portion so as to pivotally move the corresponding flap in the positive direction relatively to its lifting portion when said lifting portion is turned in the positive direction relatively to said inboard portion and so as to pivotally move said flap in the negative direction relatively to its lifting portion when said lifting portion is turned in the negative direction relatvely to said inboard portion.

References Cited in the file of this patent

UNITED STATES PATENTS

| | | |
|---|---|---|
| 1,909,450 | Bleecker | May 16, 1933 |
| 2,939,535 | Brye | June 7, 1960 |

FOREIGN PATENTS

| | | |
|---|---|---|
| 129,215 | Australia | Nov. 28, 1946 |
| 1,213,809 | France | Nov. 2, 1959 |